United States Patent
Wang

(10) Patent No.: US 12,260,149 B2
(45) Date of Patent: Mar. 25, 2025

(54) METHOD AND DEVICE FOR MULTIPLE-TERMINAL COLLABORATIVELY UPDATING DISPLAYED CONTENT

(71) Applicants: GUANGZHOU SHIYUAN ELECTRONICS CO., LTD., Guangzhou (CN); GUANGZHOU SHIZHEN INFORMATION TECHNOLOGY CO., LTD., Guangzhou (CN)

(72) Inventor: Dasheng Wang, Guangzhou (CN)

(73) Assignees: GUANGZHOU SHIYUAN ELECTRONICS CO., LTD., Guangdong (CN); GUANGZHOU SHIZHEN INFORMATION TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 18/283,132

(22) PCT Filed: Apr. 12, 2021

(86) PCT No.: PCT/CN2021/086634
§ 371 (c)(1),
(2) Date: Sep. 20, 2023

(87) PCT Pub. No.: WO2022/217433
PCT Pub. Date: Oct. 20, 2022

(65) Prior Publication Data
US 2024/0303026 A1    Sep. 12, 2024

(51) Int. Cl.
*G06F 3/14* (2006.01)
*G06F 3/04842* (2022.01)
(Continued)

(52) U.S. Cl.
CPC ........ *G06F 3/1462* (2013.01); *G06F 3/04842* (2013.01); *G06F 3/04845* (2013.01);
(Continued)

(58) Field of Classification Search
CPC .. G06F 3/1462; G06F 3/0482; G06F 3/04845; G06F 3/04883; G09G 5/12; G09G 5/14
See application file for complete search history.

(56) References Cited

U.S. PATENT DOCUMENTS

| | | |
|---|---|---|
| 2013/0076797 A1 | 3/2013 | Hou |
| 2014/0359528 A1 | 12/2014 | Murata |

(Continued)

FOREIGN PATENT DOCUMENTS

| | | |
|---|---|---|
| CN | 103747027 A | 4/2014 |
| CN | 108762628 A | 11/2018 |
| CN | 110716680 A | 1/2020 |

OTHER PUBLICATIONS

International Search report and Written Opinion received for PCT Patent Application No. PCT/CN2021/086634, mailed on Dec. 16, 2021, 11 pages including English translation.
(Continued)

*Primary Examiner* — Lisa S Landis
(74) *Attorney, Agent, or Firm* — Zhong Law, LLC

(57) ABSTRACT

The present disclosure discloses a method and device for multiple-terminal collaboratively updating a displayed content. The method includes: displaying, by the first terminal, the first application interface of the first collaborative whiteboard application, where the first collaborative whiteboard application and the second collaborative whiteboard application of the second terminal are in a collaborative mode, where the second terminal displays the second application interface of the second collaborative whiteboard application; receiving a controlling parameter transmitted by the second
(Continued)

terminal, where the controlling parameter is generated by the second terminal when receiving a controlling operation performed on the second application interface; and updating, by the first terminal, a content of the first application interface based on the controlling parameter, where the controlling operation is determined as a moving operation, the first canvas is moved based on the controlling parameter, and when an edge of the first canvas coincides with an edge of the first application interface in the same direction, re-rendering, by the first terminal, the content in the first canvas. The present disclosure solves the technical problem that the following terminal is difficult to follow when the canvas of the followed terminal expands infinitely in the prior art.

17 Claims, 7 Drawing Sheets

(51) Int. Cl.
*G06F 3/04845* (2022.01)
*G06F 3/04883* (2022.01)
*G09G 5/12* (2006.01)
*G09G 5/14* (2006.01)
*H04N 7/15* (2006.01)

(52) U.S. Cl.
CPC .......... *G06F 3/04883* (2013.01); *G09G 5/12* (2013.01); *G09G 5/14* (2013.01); *G09G 2340/045* (2013.01); *G09G 2340/0464* (2013.01); *G09G 2354/00* (2013.01); *H04N 7/155* (2013.01)

(56) References Cited

U.S. PATENT DOCUMENTS

2017/0315962 A1    11/2017   Kovar
2020/0301644 A1*    9/2020   Conny Sarevall .... G06F 3/1454

OTHER PUBLICATIONS

European Search report received for EU Patent Application No. 21936328.0, mailed on Jun. 14, 2024, 18 pages.

* cited by examiner

METHOD AND DEVICE FOR MULTIPLE-TERMINAL COLLABORATIVELY UPDATING DISPLAYED CONTENT

CROSS-REFERENCE TO RELATED APPLICATIONS

This application is the U.S. National Phase under 35. U.S.C. § 371 of International Application PCT/CN2021/086634, filed on Apr. 12, 2021, the content of which is incorporated herein by reference in its entirety.

TECHNICAL FIELD

The present disclosure relates to the field of display technologies, and in particular to a method and device for multiple-terminal collaboratively updating a displayed content.

BACKGROUND

A conference collaborative whiteboard is equipped with functionalities of presenting speech contents. During a conference, multiple terminals joining the process of the same conference collaborative whiteboard may implement the function of presentation following the display. For example, each terminal runs a conference collaborative whiteboard application, and a lecturer may transmit the content on the terminal used by himself to other terminals in the process of the same conference collaborative whiteboard. In the process, the terminal of the lecturer is a followed terminal, and other terminals are following terminal. An application interface of the following terminal can simultaneously display the application interface of the followed terminal, thereby realizing the presentation following function in the conference collaborative whiteboard application.

Commonly, at the followed terminal, it may need to use functions such as brushes to draw a content on a web drawing application (such as conference collaborative whiteboards or web drawing functions), and following terminals need to follow the operation. But in a case of using a canvas with the same size as the application interface (single-size canvas), each time the canvas is moved following the operation of the followed terminal, it is necessary to recalculate a position of each point and redraw contents on the canvas so as to achieve a canvas expansion function. Since the operation of clearing and redrawing a canvas is performed each time the canvas is moved, when the data volume in the canvas is large, the redrawing time becomes longer, or even frozen, and each movement triggers redrawing, leading to low efficiency and poor scalability.

Current technologies do not have effective solutions to solve the challenge for the following terminal to follow when a canvas of the followed terminal expands infinitely.

SUMMARY

According to embodiments of the present disclosure, a method and device for multiple-terminal collaboratively updating a displayed content is provided to solve the technical problem in the current technology of the poor view following due to differences in pixels between the followed terminal and the following terminal.

According to an aspect of embodiments of the present disclosure, a method for multiple-terminal collaboratively updating a displayed content is provided. The display updating method is used for making a first terminal synchronously display an operation of a second terminal. The first terminal provides a first application interface of a first collaborative whiteboard application, and a first canvas for carrying a drawing content of the first collaborative whiteboard application, and a first container for carrying the first canvas. The second terminal provides a second application interface of a second collaborative whiteboard application, a second canvas for carrying a drawing content of the second collaborative whiteboard application, and a second container for carrying the second canvas. A first length of the first canvas is greater than a length of the first application interface, and a width of the first canvas is greater than a width of the first application interface. The method for multiple-terminal collaboratively updating a displayed content includes: displaying, by the first terminal, the first application interface of the first collaborative whiteboard application, where the first collaborative whiteboard application and the second collaborative whiteboard application of the second terminal are in a collaborative mode, where the second terminal displays the second application interface of the second collaborative whiteboard application: receiving a controlling parameter transmitted by the second terminal, where the controlling parameter is generated by the second terminal when receiving a controlling operation performed on the second application interface; and updating, by the first terminal, a content of the first application interface based on the controlling parameter, where the controlling operation is determined as a moving operation, the first canvas is moved based on the controlling parameter, and when an edge of the first canvas coincides with an edge of the first application interface in the same direction, re-rendering, by the first terminal, the content in the first canvas.

According to another aspect of embodiments of the present disclosure, a device for multiple-terminal collaboratively updating a displayed content is also provided, the device is used for making a first terminal synchronously display an operation of a second terminal. The first terminal provides a first application interface of a first collaborative whiteboard application, and a first canvas for carrying a drawing content of the first collaborative whiteboard application, and a first container for carrying the first canvas. The second terminal provides a second application interface of a second collaborative whiteboard application, a second canvas for carrying a drawing content of the second collaborative whiteboard application, and a second container for carrying the second canvas. A first length of the first canvas is greater than a length of the first application interface, and a width of the first canvas is greater than a width of the first application interface. The device for multiple-terminal collaboratively updating a displayed content includes: a displaying module, configured to display, by the first terminal, the first application interface of the first collaborative whiteboard application, where the first collaborative whiteboard application and the second collaborative whiteboard application of the second terminal are in a collaborative mode, where the second terminal displays the second application interface of the second collaborative whiteboard application: a receiving module, configured to receive a controlling parameter transmitted by the second terminal, where the controlling parameter is generated by the second terminal when receiving a controlling operation performed on the second application interface; and an updating module, configured to update, by the first terminal, a content of the first application interface based on the controlling parameter, where the controlling operation is determined as a moving operation, the first canvas is moved based on the controlling parameter, and when an edge of the first canvas coincides with an edge of the first application interface in the same direction, re-rendering, by the first terminal, the content in the first canvas.

According to still another of the present disclosure, a computer storage medium is provided, which stores a plurality of instructions. The instructions when loaded and executed by a processor, perform any one of the above methods.

According to yet another embodiment of the present disclosure, an intelligent interactive board is provided. The interactive board includes a processor and a memory. The memory stores a computer program. The computer program, when loaded and executed by the processor, performs one of the above methods.

According to the embodiments of the present disclosure, the first terminal displays the first application interface of the first collaborative whiteboard application, where the first collaborative whiteboard application and the second collaborative whiteboard application of the second terminal are in a collaborative mode, and the second terminal displays the second application interface of the second collaborative whiteboard application: a controlling parameter transmitted by the second terminal is received, where the controlling parameter is generated by the second terminal when receiving a controlling operation performed on the second application interface; and the first terminal updates a content of the first application interface based on the controlling parameter, where the controlling operation is determined as a moving operation, the first canvas is moved based on the controlling parameter, and when an edge of the first canvas coincides with an edge of the first application interface in the same direction, the first terminal re-renders the content in the first canvas. When the above solution is coordinated by multiple terminals, multi-size canvases are set in the collaborative whiteboard application of the following terminal, so that when the following terminal follows the movement of the followed terminal, it is not necessary to clear the content on the canvas each time the canvas is moved, and to redraw the canvas, and when an edge of the canvas coincides with an edge of the application interface in the same direction in the collaborative whiteboard application of the following terminal, the content in the canvas of the collaborative whiteboard application is re-rendered, so that when the followed terminal moving an infinite canvas in the collaborative whiteboard application, the following terminal can follow the effect, which solves the technical problem that the following terminal is difficult to follow when the canvas of the followed terminal expands infinitely in the prior art.

BRIEF DESCRIPTION OF THE DRAWINGS

The accompanying drawings described herein are used to provide a further understanding of the present disclosure and constitute a part of the present disclosure. The optional embodiments of the present disclosure and their descriptions are used to explain the present disclosure and do not constitute improper limitations to the present disclosure.

DESCRIPTION OF THE PREFERRED EMBODIMENTS

Figure 1:
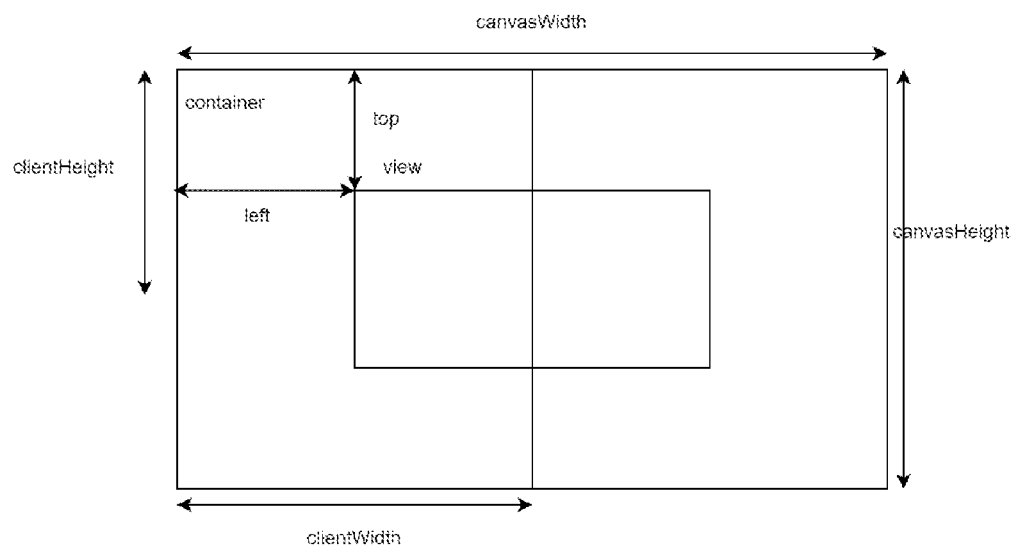
FIG. 1 is an exemplary schematic diagram of a double-size canvas according to an embodiment of the present disclosure.

In order to enable those skilled in the art to better understand the solutions of the present disclosure, the following may clearly and completely describe the technical solutions in the embodiments of the present disclosure in conjunction with the drawings in the embodiments of the present disclosure. The described embodiments are a part of embodiments of the present disclosure, but not all embodiments. Based on the embodiments of the present disclosure, all other embodiments obtained by those skilled in the art without creative efforts may fall within the protection scope of the present disclosure.

It should be noted that the terms "first" and "second" in the description and claims of the present disclosure and the above drawings are used to distinguish similar objects but are not used to describe a specific order or sequence. It should be understood that the data usage is interchangeable under appropriate circumstances, so that the embodiments of the present disclosure described herein can be implemented in sequences other than those illustrated or described herein. Furthermore, the terms "comprising" and "having", as well as any variations thereof, are intended to cover a non-exclusive inclusion. For example, a process, method, system, product or device including a sequence of steps or units is not limited to the expressly listed, but may include other steps or units that are not explicitly listed or inherent to the process, method, product or device.

Embodiment 1

In the embodiment, a first terminal and a second terminal are used for illustration, and both the first terminal and the second terminal run a collaborative whiteboard application to implement synchronous display between the first terminal and the second terminal. In the embodiment, the second terminal is the followed terminal and the first terminal is a following terminal. There may be one or more first terminals. For example, in a conference collaborative presentation scenario, the second terminal may be a terminal used by a conference presenter, and the first terminal may be a terminal used by a viewer. The first terminal follows the second terminal to display content in synchronization.

In an optional implementation scenario, the collaborative whiteboard applications run by the first terminal and the second terminal may both implement web drawing function, where a canvas is a region configured to carry a drawing content in the web drawing application. The canvas may use browser html canvas tag, where the canvas is a widely used element in HTML for rendering graphics within a web browser. Chrome kernel is used as a carrier to achieve a cross-platform effect. A container uses div tag, using the browser's absolute positioning to achieve real-time offset modifications, thereby enabling canvas movement effects. The canvas carries the drawing content of the whiteboard application. The canvas is covered with a transparent layer, and a toolbar overlays on the transparent layer. When the toolbar tool is clicked on for starting an operation, the change of the content is reflected in the canvas.

The container is used to carry the canvas, and the movement of the canvas is basically the movement of the container. When the canvas is moved, the offset from the viewport changes. Alternatively, the changes may include changes in horizontal offset and vertical offset.

The application interface of the collaborative whiteboard application is the viewport. The viewport is a region on the terminal screen that may be used to display web drawing application, which is a rectangular region related to the device. The coordinate unit is "pixel" related to the device.

In a process of using the collaborative whiteboard application, in order to expand a drawing range and achieve the effect of infinite canvas, the second terminal may use multiple-size canvases in the collaborative whiteboard application (that is, the size of the canvas is multiple times that of the application interface). The user may perform various operations on the second terminal, such as panning, stretching, writing, etc. The first terminal follows these operations to implement synchronous display with the second terminal. However, if a canvas with the same size as the application interface (single-size canvas) is used, it may recalculate the position of each point and redraw the content on the canvas each time of following the operation of the followed terminal for moving the canvas, so as to achieve the canvas expansion function. Since the canvas is cleared and redrawn each time the canvas is moved, when the data volume in the canvas is large, the redrawing time becomes longer, or even freezes, and each movement triggers redrawing, leading to low efficiency and poor scalability. Based on the problem, the embodiment proposes a new method for multiple-terminal collaboratively updating a displayed content.

Before describing the method for multiple-terminal collaboration updating a displayed content in the embodiment, firstly, the layout of the collaborative whiteboard application of the first terminal in an example that appears in the following embodiments may be described. In the example, a first canvas of the first terminal is a double-size canvas.

FIG. 1 is an exemplary schematic diagram of a double-size canvas according to an embodiment of the present disclosure. As shown in FIG. 1, the length of the first canvas is multiple times the length of the second application interface, and the width of the first canvas is also multiple times the width of the second application interface.

As shown in FIG. 1, container represents the first container for carrying the first canvas, and view represents the first application interface, that is, a size of the entire screen visible to the user.

The width of container is canvas Width, and the height is canvasHeight.

canvas Width also represents the width of the canvas, which is twice the width of view.

canvas Height also represents the height of the canvas, which is twice the height of view.

clientWidth is equal to the width of view, clientHeight is equal to the height of view, and view is centered in the center of container.

A top-left corner of container is defined as an origin, a left offset relative to a vertex of view is left, and an upper offset is top.

When a moving operation is performed, the offset is an offset value of the top and left of the container to achieve the effect of moving the canvas. It means that when the content of the canvas is moved, the movement of the canvas may be seen in view, but view does not actually change, but the underlying container that changes.

Figure 2:
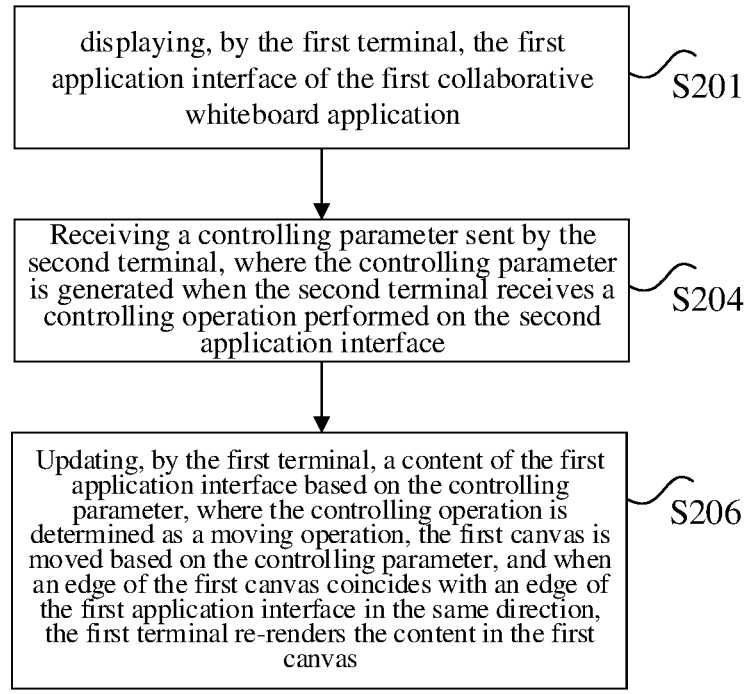
FIG. 2 is a flowchart of a method for multiple-terminal collaboratively updating a displayed content according to an embodiment of the present disclosure.

FIG. 2 is a flowchart of a method for multiple-terminal collaboratively updating a displayed content according to an embodiment of the present disclosure. The display updating method is used for making a first terminal synchronously display an operation of a second terminal. The first terminal provides a first application interface of a first collaborative whiteboard application, and a first canvas for carrying a drawing content of the first collaborative whiteboard application, and a first container for carrying the first canvas. The second terminal provides a second application interface of a second collaborative whiteboard application, a second canvas for carrying a drawing content of the second collaborative whiteboard application, and a second container for carrying the second canvas. A first length of the first canvas is greater than a length of the first application interface, and a width of the first canvas is greater than a width of the first application interface. As shown in FIG. 2, the method for multiple-terminal collaboratively updating a displayed content includes:

Step S201, displaying, by the first terminal, the first application interface of the first collaborative whiteboard application, where the first collaborative whiteboard application and the second collaborative whiteboard application of the second terminal are in a collaborative mode, where the second terminal displays the second application interface of the second collaborative whiteboard application.

Alternatively, the first terminal and the second terminal may be intelligent devices with human-computer interaction interfaces, such as mobile phones, tablet computers, intelligent interactive boards, and the like. The first terminal and the second terminal are in the collaborative mode, which means that one of the first terminal and the second terminal is a followed terminal, and the other is a following terminal, and the content displayed on the collaborative whiteboard application interface of the two is the same. That is, any display on the collaborative whiteboard interface on the followed terminal is displayed on the collaborative whiteboard interface of the following terminal. For example, if a multimedia content is displayed on the application interface of the collaborative whiteboard application of the followed terminal, the same multimedia content is displayed on the application interface of the collaborative whiteboard application of the following terminal. For another example, executing a certain operation on the application interface of the collaborative whiteboard application of the following terminal causes its application interface to change, and the same change occurs on the application interface of the collaborative whiteboard application of the following terminal. In the embodiment, the second terminal is the followed terminal, and the first terminal is the following terminal.

In an optional embodiment, in a conference collaborative presentation scenario, a user as a presenter may play a multimedia content on his own conference whiteboard (that is, the second terminal), and share the displayed content on the conference whiteboard with the conference whiteboards of other viewing users (that is, the first terminal), so that the display interface of the conference whiteboards of other viewing users may display the same multimedia content synchronously.

It should be noted that in different application scenarios, the intelligent device as the following terminal may also be the followed terminal, and the intelligent device as the followed terminal may also be used as the following terminal. The definitions of the first terminal and the second terminal above are based on the current presentation status of the intelligent device is determined.

Step S204, receiving a controlling parameter transmitted by the second terminal, where the controlling parameter is generated by the second terminal when receiving a controlling operation performed on the second application interface.

As the followed terminal, the second terminal performs a controlling operation on the second application interface to implement changes and adjustments of the presentation screen, for example, panning operation, scaling operation, and writing operation on the screen currently being displayed on the second application interface.

When the second terminal receives a controlling operation, changes corresponding to the controlling operation occur on the second application interface, and these change parameters are the controlling parameters. When the second terminal receives the controlling operation performed on the second application interface, the second terminal transmits the generated controlling parameters to the first terminal, and the first terminal may receive the controlling parameters. The controlling parameter may be used to adjust the content of the first application interface to be consistent with that of the second application interface. For example, the controlling parameter may be a coordinate parameter, and the user performs on the current screen a panning operation on the second application interface of the second terminal as the followed terminal, and the second terminal generates the coordinate parameter according to the coordinate information of the screen panning and transmits it to the first terminal as the following terminal.

Step S206, updating, by the first terminal, a content of the first application interface based on the controlling parameter, where the controlling operation is determined as a moving operation, the first canvas is moved based on the controlling parameter, and when an edge of the first canvas coincides with an edge of the first application interface in the same direction, the first terminal re-renders the content in the first canvas.

The first terminal updates the content of the first application interface based on the controlling parameters. Actually, the first canvas may be adjusted based on the controlling parameters, so as to achieve an effect of updating the content of the first application interface.

For example, if the operation on the second application interface is a panning operation, the first terminal responds to the first canvas based on the controlling parameters. If the operation on the second application interface is a scaling operation, the first terminal responds to the first operation scales the canvas based on the controlling parameters. If the operation on the second application interface is a writing operation, the first terminal generates corresponding handwriting on the first canvas based on the controlling parameters.

When the controlling operation is a moving operation, the second application interface moves based on the move operation and transmits the controlling parameters to the first terminal, and the first canvas of the first terminal moves based on the controlling parameters. The moving operation may be that the user drags the second application interface with a finger, a stylus, or an external control device (such as a mouse).

When the first terminal controls the movement of the first canvas based on the controlling parameters, there are two divided states as follows.

In the first state, edges of the first canvas and the first application interface do not coincide with each other. As shown in FIG. 1, taking the first application interface being located in the middle of the first canvas as an example, because the first canvas is a multi-size canvas, if a horizontal movement distance is less than current left offset and a vertical movement distance is less than current top offset, the edge of the first application interface may not coincide with the edge of the first canvas. The effect is equivalent to the movement of the first application interface on the first canvas. The content rendered on the first canvas fulfills the movement requirement, thereby obviating the need for a re-rendering process.

In the second state, the first canvas coincides with some edge of the first application interface. Also, referring to FIG. 1, taking the first canvas moving to the right as an example, when the distance of the first canvas moving to the right by a distance equal to the value of the current left offset, the right edge of the first canvas coincides with the right edge of the first application interface. When the first canvas continues to be moved to the right, it reaches a point where the first canvas can no longer be moved further in that direction. However, in order to follow the movement of the second canvas, the content on the first canvas needs to be re-rendered to implement the effect of the first canvas is continuing to be moved.

Figure 3A:
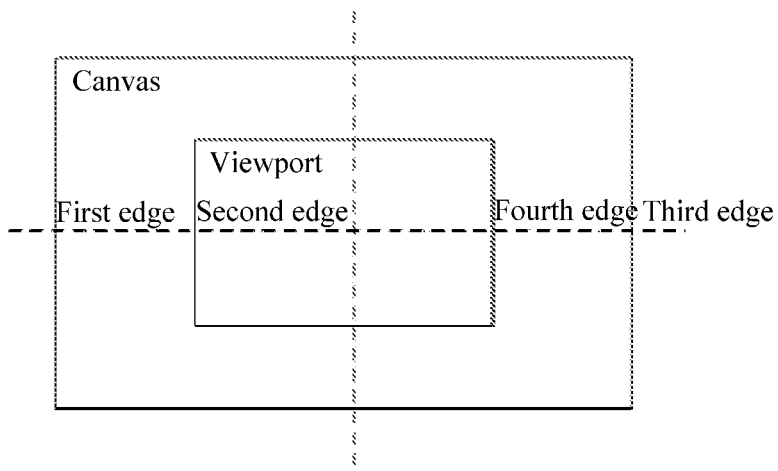
FIG. 3a is an exemplary schematic diagram of a canvas edge and a viewport edge according to an embodiment of the present disclosure.
Figure 3B:
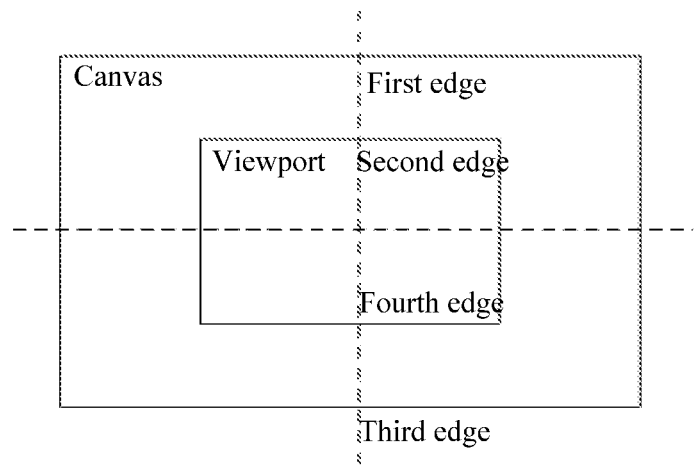
FIG. 3b is another exemplary schematic diagram of a canvas edge and a viewport edge according to an embodiment of the present disclosure.

As shown in FIG. 3a or 3b, the first canvas includes a first edge and a third edge. The first application interface includes a second edge and a fourth edge. The first edge is parallel to the third edge, and the second edge is parallel to the fourth edge. The first edge and the second edge belong to edges in the same direction. When the first canvas is moved to the right and thus causing the first edge to coincide with the second edge, re-rendering of the first canvas is triggered. The third edge and the fourth edge belong to edges in the same direction, when the first canvas is moved to the left and thus causing the third edge to coincide with the fourth edge, re-rendering of the first canvas is triggered. Similarly, when an upper edge of the first canvas coincides with an upper edge of the first application interface, or when the lower edge of the first canvas coincides with the lower edge of the first application interface, re-rendering of the first canvas is also triggered.

According to the above embodiments of the present disclosure, it can be seen that the first terminal displays the first application interface of the first collaborative whiteboard application, where the first collaborative whiteboard application and the second collaborative whiteboard application of the second terminal are in a collaborative mode. The second terminal displays the second application interface of the second collaborative whiteboard application. A controlling parameter transmitted by the second terminal is received, where the controlling parameter is generated by the second terminal when receiving a controlling operation performed on the second application interface. The first terminal updates a content of the first application interface based on the controlling parameter, where the controlling operation is determined as a moving operation. The first canvas is moved based on the controlling parameter. When an edge of the first canvas coincides with an edge of the first application interface in the same direction, the first terminal re-renders the content in the first canvas. When the above solution is coordinated by multiple terminals, multi-size canvases are set in the collaborative whiteboard application of the following terminal. When the following terminal follows the movement of the followed terminal, it is not necessary to clear the content on the canvas each time the canvas is moved, and to redraw the canvas. When the edges of the canvas and the application interface coincide with each other in the same direction in the collaborative whiteboard application of the following terminal, the content in the canvas of the collaborative whiteboard application is re-rendered. Therefore, when the followed terminal moving an infinite canvas in the collaborative whiteboard application, the following terminal can follow the effect, which solves the technical problem that the following terminal is difficult to follow when the canvas of the followed terminal expands infinitely in the prior art.

Sequentially, the manner in which the first terminal re-renders the first canvas may be described. As an optional embodiment, the first canvas includes a first edge and a third edge that are parallel with each other, and the first application interface includes a second edge and a fourth edge that are parallel with each other. The first edge and the second edge are located on the same side, and the third edge and the fourth edge are located on the same side. The first canvas at least includes a first region close to the third edge and a second region close to the first edge. The first region is adjacent to the second region. The first region is drawn with a first content, and the second region is drawn with a second content. A moving direction of the moving operation is from a side on which the first edge is located to a side on which the third edge is located. When an edge of the first canvas coincides with an edge of the first application interface in the same direction, the first terminal triggers a re-rendering of the content within the first canvas. The re-rendering includes:

Coinciding the first edge with the second edge, moving the first canvas along a direction opposite to the direction of the moving operation to a position where the third edge coincides with the fourth edge, and triggering to re-render and display the second content in the first region, and triggering to re-render and display a third content in the second region.

It should be noted that the first edge and the third edge may also be edges on the upper and lower sides, and the second edge and the fourth edge may also be edges on the upper and lower sides. The canvas may be moved horizontally and vertically, and it may also be moved at a certain angle with the application interface.

Figure 4:
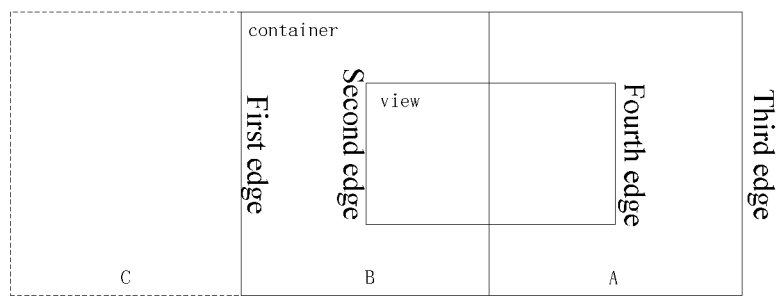
FIG. 4 is an exemplary schematic diagram of a canvas before being moved according to an embodiment of the present disclosure.

The above solution may be described in conjunction with what is shown in FIG. 4. The first container container includes a first region A close to the third edge and a second region B close to the first edge. The first region A and the second region B respectively represent a single-size canvas, which together form a double-size canvas. The first region A and the second region B are respectively drawn with corresponding first content and second content. FIG. 4 further includes a region C, which contains the third content. However, in this context, C is a virtual representation and is not displayed, and it is included for illustrative purposes. The moving direction of the moving operation is from a side on which the first edge is located to a side where the third edge is located. The moving direction is to move the first container to the right. If the first edge of the first container does not coincide with the second edge of the first application interface (view), only movement of the canvas occurs, and there is no rendering. During the movement, the corresponding content is displayed in the first application interface (view) based on the movement offset.

As the first canvas is controlled to move from the first edge towards the third edge, after the first edge coincides with the second edge, re-rendering of the content of the canvas is triggered. The canvas moves in the opposite direction to movement, and reaches a position where the third edge coincides with the fourth edge. If the movement continues in the same direction, the above process is repeated. When the first edge does not touch the second edge, the canvas content may not be re-rendered. When the first edge contact with the second edge, the canvas content is re-rendered and moved along the opposite direction to a position where the third edge coincides with the fourth edge.

Figure 5:
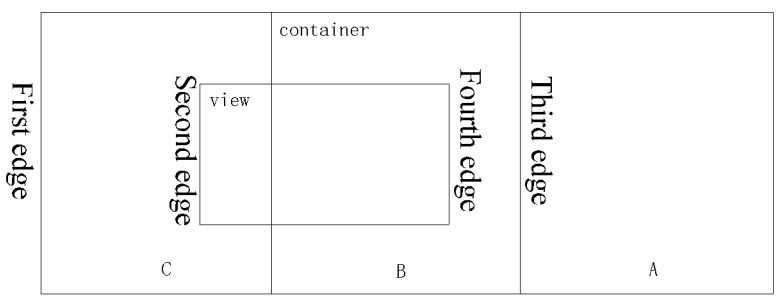
FIG. 5 is an exemplary schematic diagram of a canvas after being moved according to an embodiment of the present disclosure.

For example, as shown in FIG. 5, if the first canvas continues to move on the basis of FIG. 4, when the first edge of container collides with the second edge of view, a redraw operation of the canvas is triggered. Alternatively, the first canvas moves in the opposite direction until the third edge coincides with the fourth edge. Herein, region B is the updated first region, and region C is the updated second region. The first region displays the second content of region B, and the second region displays the third content in region C. The canvas content that was previously represented by AB is re-rendered to display BC. Due to a relatively small size of the canvas, the redrawing speed is faster. Therefore, users do not perceive the redraw. The view at this time displays the content of regions B and C. When container continues to move to the right, the view still displays the content from regions B and C, until the first edge collides with the second edge again. It may be further understood that only regions A and B are included in the whole process. After re-rendering, the content of region A is redrawn to represent the content of region B, and the content of region B is redrawn to represent the content of region C.

The above solution takes the first canvas moving to the right as an example to illustrate how to re-render when the left edge of the first canvas coincide with the first application interface. When the first canvas moves to the left so as to coincide with the right edge of the first application interface, or when the first canvas moves upwards so as to coincide with the lower edge of the first application interface, or when the first canvas moves downwards so as to coincide with the upper edge of the first application interface, the method is similar and may not be repeated herein.

As an optional embodiment, before the first terminal displays the same content as the second application interface of the second terminal on the first application interface of the first terminal, the above method further includes: causing at least one the first terminal and the second terminal join in a same virtual room.

The above-mentioned virtual room is used to represent a group in the collaborative whiteboard application, and multiple terminals joining the same virtual room are in the same group. When the collaborative function is used, a virtual room may be created, and a virtual room identifier of the virtual room may be generated. Other terminals may join the virtual room through a virtual room identifier. The virtual room identifier may be a virtual room number or a virtual room QR code, etc. Other terminals may join the virtual room by inputting the virtual room number or scanning the virtual room QR code. After joining the virtual room, the terminal in the virtual room may set a terminal identity, for example, it may be set as a following terminal or a followed terminal.

Taking the conference collaborative demonstration scenario as an example, a terminal starts the collaborative whiteboard application to generate a conference room (e.g., the above-mentioned virtual room), and the collaborative whiteboard application generates a corresponding QR code for the conference room. The terminal shares the generated QR code with other objects participate in the conference, and the other objects use their own terminals to scan the QR code to join the above conference room. Therefore, multiple participating terminals join a common conference room.

After the multiple terminals join in the same virtual room and the identities of the first and second terminals are set, synchronous display of the second terminal to the first terminal may be started.

As an optional embodiment, the controlling parameter being generated when the second terminal receives the controlling operation performed on the second application interface. The process include the following steps. The second terminal receives the controlling operation performed on the second application interface, wherein the second canvas changes based on the controlling operation. The second terminal receives a changing parameter generated by the second canvas based on the change of the controlling operation as the controlling parameter. The second terminal transmits the controlling parameter to the first terminal.

Taking the conference collaborative demonstration scenario as an example, the lecturer performs a controlling operation on the second application interface of the second terminal, and the second collaborative whiteboard application executes the controlling operation to make the second application interface change. For example, if the controlling operation is a moving operation, the second collaborative whiteboard application controls the movement of the second canvas based on the controlling operation. If the controlling operation is a scaling operation, the second collaborative whiteboard application controls the second canvas to scale based on the controlling operation. If the controlling operation is a writing operation, the second collaborative whiteboard application generates corresponding handwriting on the second canvas.

In the process, the second collaborative whiteboard application not only controls the second application interface to change in response to the controlling operation based on the controlling operation, but also transmits the changing parameter as a controlling parameter to the first terminal, so that the first terminal can follow the changes in the second application interface based on the changing parameter.

For example, if the controlling operation is a moving operation, the controlling parameter may be a position offset generated by the second canvas when the controlling operation is performed. If the controlling operation is a scaling operation, the controlling parameter may be a scaling ratio and a position offset generated when the second collaborative whiteboard application controls to scale the second canvas based on the controlling operation. If the controlling operation is a writing operation, the controlling parameter may be handwriting data when the second collaborative whiteboard application generates corresponding handwriting on the second canvas.

As an optional embodiment, when a first resolution parameter of the first application interface is different from a second resolution parameter of the second application interface, the first terminal updates the content of the first application interface based on the controlling parameter. The process includes the following steps, the first terminal updates the controlling parameter based on the first resolution parameter and the second resolution parameter. The first terminal updates the content of the first application interface based on the updated controlling parameter.

Alternatively, the first resolution parameter of the above-mentioned first application interface is used to indicate the number of pixels of the first application interface in the vertical and horizontal directions. The second resolution of the second application interface is used to indicate the number of pixels of the second application interface in the vertical and horizontal directions. The unit of measurement for the parameters is pixels (px).

In the case that the first application interface and the second application interface have a same resolution, the first collaborative whiteboard application may directly control the first application interface based on the controlling parameters, so that the first application interface follows the second application interface.

In the case that the resolutions of the first application interface and the second application interface are different, if the first collaborative whiteboard directly uses the acquired controlling parameters to control the first application interface, the resolutions of the two application interfaces are different, the dissimilarity in resolutions between the two interfaces results in a control effect that doesn't align with the display effect of the second application interface. Consequently, the first terminal further updates the controlling parameters based on the first resolution of the first application interface and the second resolution of the second application interface. The first terminal updates the content of the first application interface based on the updated parameter.

The above-mentioned updating of the controlling parameters may be to adjust the controlling parameters to controlling parameters that match the first resolution parameter of the first display interface. The first terminal, acting as a following terminal, updates the controlling parameters provided by the second terminal based on the first and second resolution parameters. Therefore, the first terminal may adjust the displayed content in the first application interface based on the updated controlling parameters, and thus, the displayed content in the first application interface becomes consistent with the content displayed on the second application interface.

In the above solution, the first terminal adjusts the first canvas based on the controlling parameters that match the first resolution of its first application interface, thereby realizing a technical effect of synchronizing the perspectives between the first application interface of the first terminal as the following terminal and the second application interface of the second terminal as the followed terminal.

As an optional embodiment, the first terminal updates the controlling parameter based on the first resolution parameter and the second resolution parameter.

The process includes the following steps. The first terminal reads the second resolution parameter transmitted by the second terminal. The first terminal obtains a ratio of the first resolution parameter to the second resolution parameter. The first terminal multiplies the ratio by the controlling parameter to obtain an updated controlling parameter.

Alternatively, the ratio of the first resolution parameter to the second resolution parameter includes a height ratio of the two and a width ratio of the two. When the height ratio of the two and the width ratio of the two are equal, either one may be selected from the height ratio and the width ratio and multiplied by the controlling parameter for obtaining the updated control parameters. When the height and width ratios are not equal, the smaller one may be selected and multiplied by the controlling parameter, so that the updated controlling parameter is obtained.

In an optional embodiment, if the controlling operation is a writing operation, the controlling parameter is the writing point generated by the writing operation. The width in the second resolution parameter is A_Width. The width in the first resolution parameter is B_Width. Coordinate information of a writing point on the second application interface is $(X_A, Y_A)$. The coordinate information $(X_B, Y_B)$ of the corrected image point in the first application interface is as follows:

$$X_B = X_A*(B\_Width/A\_Width); Y_B = Y_A*(B\_Width/A\_Width).$$

Wherein $X_B$ is an abscissa of the updated icon of the first application interface. $Y_B$ is an ordinate of the updated icon of the first application interface. B_Width/A_Width is the width ratio of the first application interface and the second application interface. Through the above calculation, the first terminal may acquire the coordinate data updated based on the resolution correction.

In the embodiment, the first terminal displays the same content as the second application interface of the second terminal in the first application interface, and the second terminal generates controlling parameters based on the controlling operation of the user on the second application interface. The controlling parameters is transmitted to the first terminal, and the first terminal updates the controlling parameters based on the first resolution parameter and the second resolution parameter. The first terminal then adjusts the content of the first application interface based on the updated controlling parameters. As a following terminal, the first terminal updates the original controlling parameter transmitted by the first terminal based on their respective resolution parameters to acquire controlling parameters that match the first application interface, thereby realizing the purpose of maintaining consistency of display contents in the application interfaces of the first and second terminals. This approach enables proportional perspective between the following terminal and the followed terminal, solving the problem of a poor effect of perspective following caused by different pixels between the two terminals.

As an optional embodiment, the controlling parameters include an initial coordinate parameter and a movement increment. The initial coordinate includes coordinates of a top-left corner of the first application interface and coordinates of an absolute origin on the first canvas, with a first deviation in the horizontal direction and a second deviation in the vertical direction. The movement increment includes a first increment in the horizontal direction and a second increment in the vertical direction generated when the second canvas moves in the second application interface. The first canvas is moved based on the controlling parameter, and the process is as follows.

Updating, by the first terminal, the first deviation by the first increment; updating, by the first terminal, the second deviation by the second increment; determining a horizontal offset of the first canvas based on the first deviation and the width of the first application interface; determining a vertical offset of the first canvas based on the second deviation and the height of the first application interface; and controlling the first canvas to move the horizontal offset in the horizontal direction, and to move the vertical offset in the vertical direction.

Alternatively, the absolute origin on the first canvas may be the point at the top-left corner of the first canvas, which is the top-left corner point of the first container. The initial coordinate is the deviation between the top-left corner of the first canvas and the origin point before the movement, including the first deviation in the horizontal direction and the second deviation in the vertical direction. The movement increment represents the horizontal and vertical increments generated by the second application interface when the second canvas is moved.

In the above solution, the initial coordinates (including the first deviation and the second deviation) of the first canvas are updated based on the increments in the horizontal and vertical directions generated by the second application interface when the second canvas is moved. The actual offset of the first canvas (including horizontal offset and vertical offset) is determined based on the updated coordinates, and the first canvas is controlled to move based on the actual offset. Therefore, the first application interface can follow the moving operation on the canvas in the second application interface.

In the above solution, the events emitted by the Canvas may be monitored by using browser Canvas tag and hammer open-source library to recognize the movement of the canvas.

In an optional embodiment, SinglePanStart indicates that starting of mouse (or touch) movement is triggered, SinglePanMove indicates that process of mouse (or touch) movement is triggered, and SinglePanEnd indicates that the mouse movement (or touch) ends. The events may follow the sequence of SinglePanStart being triggered first, then SinglePanMove is triggered, and finally SinglePanEnd is triggered.

In the second application interface, pressing the space bar and mouse movement triggers movement of the second canvas. When the space bar is pressed and SinglePanStart is triggered, moveOriginPointX is used to temporarily store the horizontal coordinates at which the movement starts, and moveOriginPointY is used to temporarily store the vertical coordinates at which the movement begins. When the space bar is pressed+mouse movement is triggered, calculate the horizontal offset (dx, equivalent to the aforementioned first increment) using curOriginPointX−moveOriginPointX and calculate the vertical offset (dy, equivalent to the aforementioned second increment) using curOriginPointY−moveOriginPointX based on the position after the movement. After obtaining dx and dy, a variable drawOrigin is used to store the position information as follows.

drawOriginX2=drawOriginX1+*dx*,
drawOriginY2=drawOriginY1+*dy* drawOrigin(drawOriginX1, drawOriginY1) indicates the position of the top-left corner of the first application interface from the origin point (and the above-mentioned initial coordinate). When the new drawOrigin(drawOriginX2, drawOriginY2) is obtained, the offset of the canvas is recalculated.

As an optional embodiment, the horizontal offset of the first canvas is determined based on the first deviation and the width of the first application interface. This includes the following steps. If the updated first deviation is greater than 0, calculate the horizontal offset as a first remainder of dividing the updated first deviation by the width of the first application interface. If the updated first deviation is no more than 0, * a second remainder of dividing the updated first deviation by the width of the first application interface, determining the horizontal offset as the sum of the width of the first application interface and the second remainder. The determining the vertical offset of the first canvas based on the second deviation and the height of the first application interface includes: when the updated second deviation is greater than 0, determining the vertical offset as a third remainder of dividing the updated second deviation by the height of the first application interface: when the updated second deviation is no more than 0, acquiring a fourth remainder of dividing the updated second deviation by the height of the first application interface, and determining the vertical offset as the sum of the height of the first application interface and the fourth remainder.

After the updated first offset and second offset are obtained, the offset calculation of the first canvas is performed. In an optional embodiment, base Width is used to represent the width of the first application interface, baseHeight is used to represent the height of the first application interface, left is used to represent the horizontal offset of the first canvas, and top is used to represent the vertical offset of the first canvas shift:

When drawOriginX>0, left=−(drawOriginPointX % base Width).
When drawOriginX<0, left=−(base Width+drawOriginPointX % baseWidth).
When drawOriginY>0, top=−(drawOriginPointY % baseHeight).
When drawOriginX<0, top=−(baseHeight+drawOriginPointY % baseHeight).

Finally, left offset and top are the offset values of the actual perspective of canvas tag. Through the above process, the first collaborative whiteboard application follows the movement operation of the second collaborative whiteboard application through controlling parameters.

As an optional embodiment, when an abscissa of a corner of the first canvas is the same as that of at least one corner of the first application interface, or an ordinate of a corner of the first canvas is the same as that of at least one corner of the first application interface, it is determined that an edge of the first canvas coincides with an edge of the first application interface in the same direction.

In the above steps, if the abscissa of a corner of the first canvas is the same as that of at least one corner of the first application interface, or the ordinate of a corner of the first canvas is the same as that of at least one corner of the first application interface, it means that a side of the first canvas coincides with a side of the first application interface.

Figure 6:
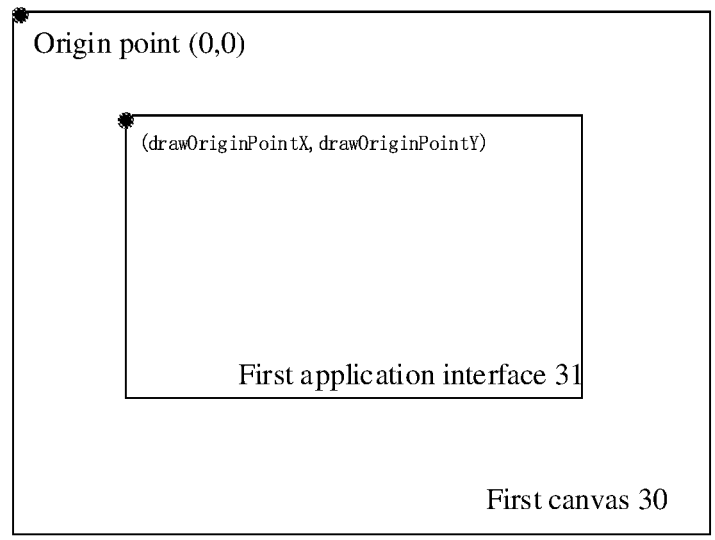
FIG. 6 is a schematic diagram of determining whether the edges of the canvas and the application interface coincide with each other according to an embodiment of the present disclosure.

Alternatively, as shown in FIG. 6, the top-left corner of the first canvas 30 is the origin point (0,0), and the coordinates of the top-left corner of the first application interface 31 are (drawOriginPointX, drawOriginPointY). When the left edge of the first canvas 30 coincides with the left edge of the first canvas 30, drawOriginPointX is 0, that is, the abscissa of the two is the same. When the right edge of the first canvas 30 coincides with the right edge of the first application interface 31, the abscissa of the two is also the same. When the right edge of the first canvas 30 coincides with the upper edge or the lower edge of the first application interface 31, the vertical coordinates of the two are the same.

As an optional embodiment, the width of the first canvas is a preset multiple of the width of the first application interface, the height of the first canvas is a preset multiple of the height of the first application interface, and the preset multiple is greater than 1 but less than 3.

The application interface is a region on the screen used to display the collaborative whiteboard application. If the first canvas is lower, for example, a canvas that is 5 times the size of the application interface is used, and the application interface is located in the center of the canvas. By moving the canvas, the offset is calculated, so that contents at different positions on the canvas are displayed on the application interface based on the offset, thereby realizing the function of canvas expansion. However, to expand the size of the canvas, the size of the canvas needs to be increased. Each time of rendering or drawing, all content on the infinite canvas needs to be cleared first and re-rendered. As a result, as the canvas becomes larger, the clearing and redrawing area increases, resulting in that there is a large delay and the phenomenon of stuttering is obvious when the canvas redraws graphics data. However, if a canvas with the same size as the application interface (single-size canvas) is used, each time the canvas is moved, it is necessary to recalculate the position of each point and redraw the content on the canvas so as to achieve the canvas expansion function. Since the canvas is cleared and redrawn each time the canvas is moved, when the data volume in the canvas is large, the redrawing time becomes longer, or even freezes, and each movement triggers redrawing, leading to low efficiency and poor scalability.

The above solution selects a canvas with a multiple size between 1 but3, so that it is unnecessary to re-render each time the canvas is moved, which may not cause too large delay when the canvas is redrawn. Therefore, a canvas between 1 but 3 times has a better experience in use.

As an optional embodiment, the width of the first canvas is twice the width of the first application interface, and the height of the first canvas is twice the height of the first application interface.

In the above solution, the first canvas is a double-size canvas, that is, the width of the first canvas is twice the width of the first application interface, and the height of the first canvas is also twice the height of the first application interface.

As an optional embodiment, when the edges of the first canvas and the first application interface in the same direction do not coincide with each other, re-rendering of the content in the first canvas is prohibited.

Still with reference to FIG. 3*a*, when the first canvas is controlled to move from the direction of the first edge to the direction of the third edge, if the first edge of the first canvas does not coincide with the second edge of view of the first application interface, only the container is moved at this time, and there is no rendering. During the movement, corresponding content is displayed on the first application interface based on the movement offset.

As an optional embodiment, when the controlling operation is a scaling operation based on a target point, the controlling parameters include a scaling parameter and an offset parameter, wherein the offset parameter is a deviation between the coordinates of the target point and the coordinates of the top-left corner of the second canvas. The first terminal updates the content of the first application interface based on the controlling parameters, and the steps includes: controlling, by the first terminal, the first canvas to scale with respect to the origin point based on the updated scaling parameter to obtain the scaled first canvas with respect to the origin; determining the adjusted offset parameter based on the scaling parameter and the offset parameter: controlling, by the first terminal, the scaled first canvas to move with respect to the origin point based on the adjusted offset parameter, and obtaining the scaled first canvas with respect to the target point; and re-rendering an element in the scaled first canvas with respect to the target point to update the content of the first application interface.

Alternatively, the above-mentioned target point is any image point on the second display interface. For example, if the presenter user clicks on a certain point on the second application interface with the mouse and performs a scaling-up operation based on this point, this point is the target point of the scaling operation. The above offset parameter represents the deviation between the coordinates of the target point and the coordinates of the top-left corner of the second canvas, including two values in the horizontal direction and vertical direction, which are commonly related to the size of the second canvas. For example, if the width and height of the second canvas are respectively x and y, the offset parameter would be (−x, −y).

The scaling parameter indicates the scaling ratio of the screen after the scaling operation compared to before the operation. An initial value of the scaling parameter is 1, indicating that the magnification of the image on the display interface after the scaling operation is the same as that of the interface image before the operation. The offset parameter includes the offset value in the X direction (the deviation between the target point's horizontal coordinate and the origin) and the offset value in the Y direction (the deviation between the target point's vertical coordinate and the origin).

Figure 7A:
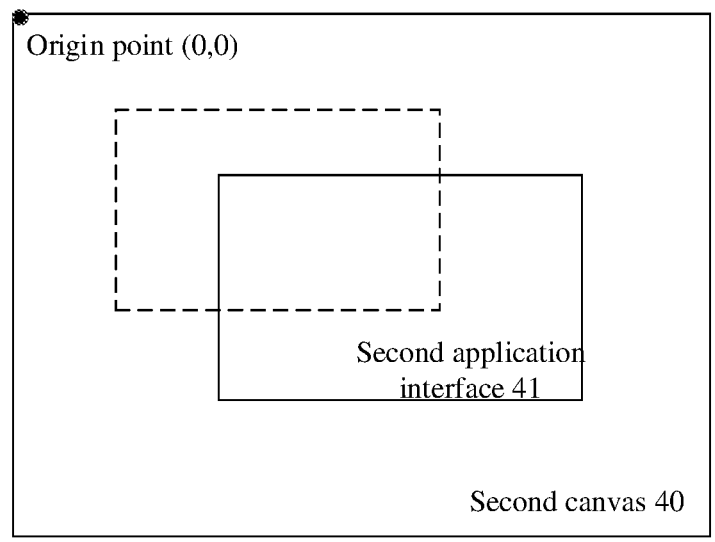
FIG. 7a is a schematic diagram of scaling based on an origin according to an embodiment of the present disclosure.
Figure 7B:
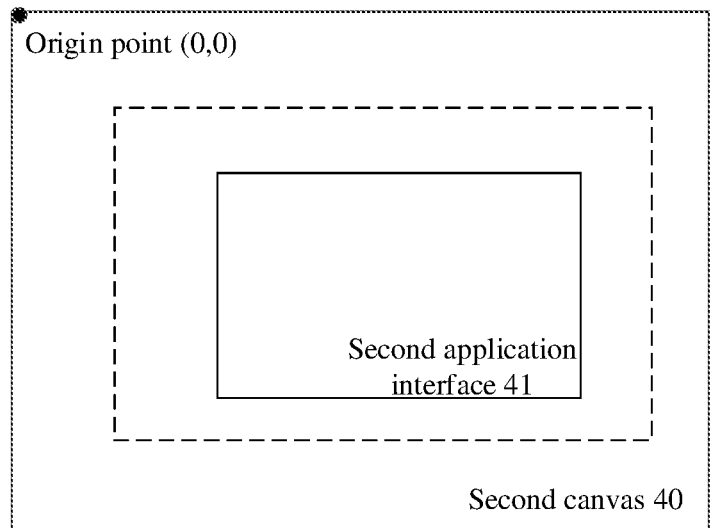
FIG. 7b is another schematic diagram of scaling based on an origin according to an embodiment of the present disclosure.

In the case where the target point is the origin, the offset parameter is 0. As shown in FIG. 7a, there is a second application interface 41 on the second canvas 40, the dotted line region represents the region of the image before the scaling-up operation. When the scaling-up operation is triggered, as shown in FIG. 7b, the scaling-up occurs from the origin point of the interface to the bottom-right corner. The position of the interface origin in the top-left corner remains unchanged, and the other pixels are scaled up based on the scaling parameter, so that the region point of the image area becomes farther and farther away from the origin point of the interface as it is scaled up. As shown in FIG. 7b, after the scaling-up operation, the second application interface is magnified to filled with the expanded second canvas 40, realizing image magnification.

Figure 8A:
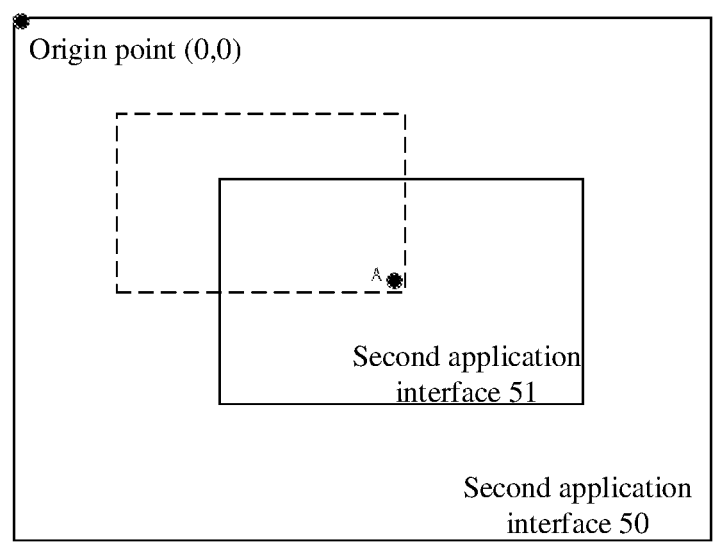
FIG. 8a is a schematic diagram of scaling based on a target point according to an embodiment of the present disclosure.

In the case that the target point is not the origin, as shown in FIG. 8a, the presenter performs a scaling-up operation based on the target point A on the second application interface 50. The target point A is a pixel point on the second application interface, and the scaling parameter of the second application interface is curScale, and the offset parameters of the target point A include an offset value canvasTranslateOffsetX in the X direction and an offset value canvasTranslateOffsetY in the Y direction, where curScale increases by 0.1 times each time, that is, increases based on 0.1, 0.2 . . . , 1, 1.1, 1.2, 1.3 . . . . The minimum value and the increment value are both 0.1.

In the case where the first resolution parameter and the second resolution parameter are different, based on the width A_Width of the second resolution parameter and the width B_Width of the first resolution parameter, the updated ratio parameter curScale1 for scaling the first terminal, the updated offset value canvasTranslateOffsetX1 in the X direction and the updated offset value canvasTranslateOffsetY1 in the Y direction are obtained $$curScale1 = curScale * (B\_Width/A\_Width);$$

$$canvasTranslateOffsetX1 = canvasTranslateOffsetX * (B\_Width/A\_Width);$$

$$canvasTranslateOffsetY1 = canvasTranslateOffsetY * (B\_Width/A\_Width);$$

Figure 8B:
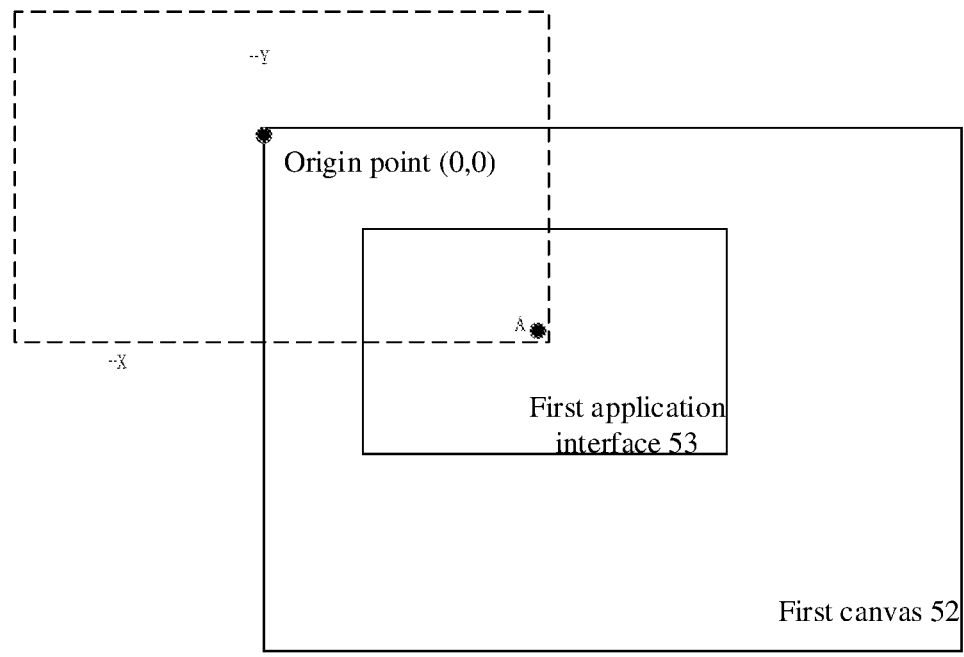
FIG. 8b is another schematic diagram of scaling based on a target point according to an embodiment of the present disclosure.

Firstly, the first canvas is controlled to be scaled based on the updated scaling parameter, and the first canvas scaled based on the origin point is obtained, that is, the position of the origin point in the top-left corner of the first application interface remains unchanged, and based on the updated scaling parameter curScale1, pixels other than the origin point of the interface are scaled in. As shown in FIG. 8b, on the first application interface 53 in the first canvas 52, the image within the dotted line is the enlarged image. The acquired content at this time is the result of being scaled in based on the origin point, but the target point is not the origin point at this time, so it is necessary to offset the result of being scaled in based on the origin.

When a scaling-in result is offset based on the origin point, first the offset parameter of the target point is adjusted based on the scaling ratio to obtain the offset parameter corresponding to the scaling-in result based on the origin point, and then the first canvas which is scaled based on the origin point is moved based on the adjusted offset parameter, so that the position of the scaled first canvas is obtained. Re-rendering is carried out based on the position of the scaled first canvas, so that following the scaling operation of the first collaborative whiteboard application on the second collaborative whiteboard application is implemented.

As an optional embodiment, the determining the adjusted offset parameter based on the scaling parameter and the offset parameter includes: acquiring relative coordinates of the target point in the second application interface: projecting the target point onto the single-size container to obtain absolute coordinates of the target point on the single-size container; subtracting the absolute coordinates from the sum of the relative coordinates and the offset coordinates of the second application interface to obtain a first intermediate value, where the offset coordinates of the second application interface are used to indicate the difference between the coordinates of the top-left corner of the second application interface and the coordinates of the origin point on the second canvas: multiplying the difference between the scaling parameter and 1 by the absolute coordinates to obtain a second intermediate value; and subtracting the first intermediate value from the second intermediate value to obtain an adjusted offset parameter.

Alternatively, the relative coordinates of the above-mentioned target point in the second application interface is the coordinate acquired directly based on the scaling operation. For example, the user clicks on a point in the second application interface to perform the scaling operation. The coordinates of the point on the second application interface is the above-mentioned relative coordinates. The single-size container above is used to denote a container having an once size, that is, a container having its original size if being not scaled. Since the scaling operation may still be performed before the current scaling operation, it is necessary to map the offset parameter to the single-size container for calculation.

In an optional embodiment, if the position when the scaling operation is performed on the second application interface is the relative position, that is, (clickX, clickY), and the coordinate difference between the top-left corner of the second application interface and the origin point in the second canvas is (drawOriginPointX, drawOriginPointY), the above offset parameter is canvasTranslateOffsetX, then the projecting the target point onto the single-size container based on the offset parameter may be:

$$posX = (X1 + drawOriginPointX + canvasTranslateOffset)/curScale;$$
$$posY = X1 + drawOriginPointX + canvasTranslateOffset/curScale;$$

where (posX, posY) is the absolute coordinates, and curScale is a scaling ratio of the first canvas before the scaling operation:

then, canvasTranslateOffset is updated through the scaling ratio curScale of the scaling and the above absolute coordinates to obtain canvas TranslateOffset2:

$$canvasTranslateOffsetX:2 =$$
$$(curScale - 1) * posX - (clickX + drawOriginPointX - posX);$$
$$anvasTranslateOffsetY2 =$$
$$(curScale - 1) * posY - (clickY + drawOriginPointY - posY);$$

where clickX+drawOriginPointX−posX constitutes the above-mentioned first intermediate value, and (curScale−1) *posY constitutes the above-mentioned second intermediate value.

As an optional embodiment, when the controlling operation is an element adding operation, the controlling parameters include: the coordinate parameter of handwriting, and the updating, by the first terminal, the content of the first application interface based on the controlling parameter includes: generating, by the first terminal, handwriting based on the coordinate parameter of the handwriting, where the coordinate parameter of the handwriting includes coordinate parameters of the writing points constituting the handwriting, and transmitting, by the second terminal, the coordinate parameters of all the generated writing points of the current handwriting to the first terminal each time the second terminal generates a new writing point.

Figure 9:
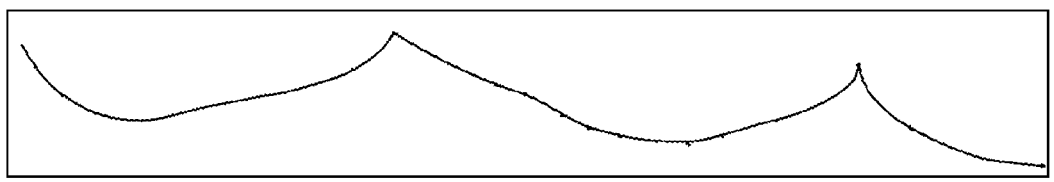
FIG. 9 is a schematic diagram of handwriting composed of multiple points according to an embodiment of the present disclosure.

Alternatively, the above-mentioned element adding operation may be an operation of the presenter writing on the second display interface. In an optional embodiment, the data written by the presenter writing with a brush on the second display interface is defined as data consisting of multiple points (i.e. writing points), for example, as shown in FIG. 9, is defined as lines consisting of multiple points written by the demonstrator. When the presenter is writing, the points consisting the writing line continue to increase, and the coordinate parameters of each writing point are transmitted to the first terminal in real time, and the first terminal may draw after receiving the coordinate parameters of each writing point, and the same handwriting is obtained to implement the following to the element adding operation.

It should be noted that, when the first resolution parameter of the first application interface is different from the second resolution parameter of the second application interface, the first terminal updates the received controlling parameters (including interface origin coordinates, stretching ratio, and offset parameters) based on the width A_Width in the first resolution parameter and the width B_Width in the second resolution parameter. Through calculation, operations such as scaling and translation of the brush line can be implemented, and the effect of proportional perspective following of the brush writing can be implemented.

In an optional embodiment, canvas technology of web is used to implement the brush writing function, and the data structure is defined as follows: Id indicates the unique identifier used to represent the element: x is the absolute horizontal coordinate of the element on the drawing board: y is the absolute vertical coordinate of the element on the drawing board; width is the width of the element; height is the height of the element: type is the type of the element, such as a brush; isDeleted defines whether to be deleted: Points defines the points on the drawing board, a line consists of many points. When the presenter user performs writing operations on the second display interface and the brush data on the second display interface is updated, the data in Points continues to increase, and is transmitted to the first terminal in real time, thereby achieving real-time data update. Each data transmission adopts the manner of replacing points in full to ensure data consistency.

The embodiment implements the function of proportional perspective following of multiple-terminal collaboratively (presenter mode) based on web technology. Data transmission between the following terminal and the followed terminal uses 4 variables to update different resolutions, resulting in minimal data transfer and a lightweight solution. In the case of no user perception, the function of infinite perspective following (presenter mode) of multiple-terminal collaboratively is implemented on the finite interactive whiteboard, which brings high maintainability. In addition, the perspective following of writing can be implemented, and the coupling between the drawing board layout and the writing function is better separated, which brings high scalability.

In an optional embodiment, the first terminal generates handwriting based on the coordinate parameter of the handwriting, including: when the handwriting contacts with any edge of the first application interface, triggering to move the first canvas in a direction opposite to the direction of contacting with the edge. In case where an edge of the first canvas coincides with an edge of the first application interface in the same direction, the first terminal redraws the content in the first canvas.

In the above solution, when the user writes on the second application interface, if the handwriting contacts with the edge of the second application interface, the second application interface is triggered to move in a direction opposite to the direction of contacting with the edge, so as to provide the user with a larger writing range. In this case, in order to follow the writing operation of the second terminal, the first terminal generates the handwriting also contacts with the edge of the first application interface, and the first canvas also moves in a direction opposite to the direction of contacting with the edge. That is, although the user does not directly move the second canvas, the writing operation triggers the movement of the second application interface, and the first application interface also needs to follow the operation to move the first canvas.

In the process of moving the first canvas, it is necessary to determine whether the edge of the first canvas coincides with the edge of the first application interface, so as to determine whether the content on the first canvas needs to be rendered. In the case that the edges of the first canvas and the first application interface coincide with each other in the same direction, the first terminal redraws the content in the first canvas, and the redrawing steps are the same as the re-rendering steps in the above embodiment, which may not be repeated herein.

Embodiment 2

Figure 10:
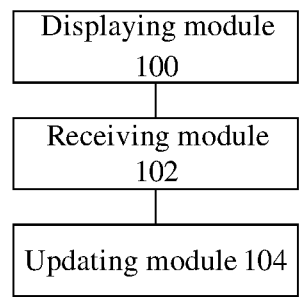
FIG. 10 is a schematic diagram of a device of multiple-terminal collaboration according to an embodiment of the present disclosure.

According to the embodiment of the present disclosure, a device for multiple-terminal collaboratively updating a displayed content is provided. The device is used for making a first terminal synchronously display an operation of a second terminal. The first terminal provides a first application interface of a first collaborative whiteboard application, and a first canvas for carrying a drawing content of the first collaborative whiteboard application, and a first container for carrying the first canvas. The second terminal provides a second application interface of a second collaborative whiteboard application, a second canvas for carrying a drawing content of the second collaborative whiteboard application, and a second container for carrying the second canvas. A first length of the first canvas is greater than a length of the first application interface, and a width of the first canvas is greater than a width of the first application interface. As shown in FIG. 10, the device for multiple-terminal collaboratively updating a displayed content includes:
  a displaying module 100, configured to display, by the first terminal, the first application interface of the first collaborative whiteboard application, where the first collaborative whiteboard application and the second collaborative whiteboard application of the second terminal are in a collaborative mode, and display, by the second terminal, the second application interface of the second collaborative whiteboard application;
  a receiving module 102, configured to receive a controlling parameter transmitted by the second terminal, where the controlling parameter is generated by the second terminal when receiving a controlling operation performed on the second application interface; and
  an updating module 104, configured to update, by the first terminal, a content of the first application interface based on the controlling parameter, where the controlling operation is determined as a moving operation, the first canvas is moved based on the controlling parameter, and when an edge of the first canvas coincides with an edge of the first application interface in the same direction, the first terminal re-renders the content in the first canvas.

As an optional embodiment, the first canvas includes a first edge and a third edge that are parallel with each other, the first application interface includes a second edge and a fourth edge that are parallel with each other, the first edge and the second edge are located on the same side, and the third edge and the fourth edge are located on the same side, the first canvas at least includes a first region close to the third edge and a second region close to the first edge, the first region is adjacent to the second region, and the first region is drawn with a first content, the second region is drawn with a second content, a moving direction of a moving operation is from a side on which the first edge is located to a side on which the third edge is located, the updating module includes:
  a rendering sub-module, configured to coincide the first edge with the second edge, move the first canvas along a direction opposite to the direction of the moving operation to a position where the third edge coincides with the fourth edge, and trigger the rendering of the first region as the second content, and render the second region as the third content.

As an optional embodiment, the above-mentioned device further includes: a joining module, configured to before the first terminal displays the same content as the second application interface of the second terminal on the first application interface of the first terminal, join, by at least one of the first terminal and the second terminal, a same virtual room.

As an optional embodiment, the second terminal receives the controlling operation performed on the second application interface, where the second canvas changes based on the controlling operation: the second terminal determines a changing parameter generated by the second canvas based on the change of the controlling operation as the controlling parameter; and the second terminal transmits the controlling parameter to the first terminal.

As an optional embodiment, when a first resolution parameter of the first application interface is different from a second resolution parameter of the second application interface, the updating module includes:
  a first updating sub-module, configured to update, by the first terminal, the controlling parameter based on the first resolution parameter and the second resolution parameter; and
  a second updating sub-module, configured to update, by the first terminal, the content of the first application interface based on the updated controlling parameter.

As an optional embodiment, the first updating sub-module includes: a reading unit, configured to read, by the first terminal, the second resolution parameter transmitted by the second terminal: an acquiring unit, configured to acquire, by the first terminal, a ratio of the first resolution parameter to the second resolution parameter; and a multiplying unit, configured to multiply, by the first terminal, the ratio by the controlling parameter to obtain an updated controlling parameter.

As an optional embodiment, the controlling parameters include: an initial coordinate parameter and a movement increment. The initial coordinate includes: coordinates of a top-left corner of the first application interface and coordinates of an absolute origin on the first canvas, a first deviation in the horizontal direction and a second deviation in the vertical direction, and the movement increment includes: a first increment in the horizontal direction and a second increment in the vertical direction generated when the second canvas moves in the second application interface. The moving module includes: a third updating sub-module, configured to update, by the first terminal, the first deviation by the first increment; a fourth updating sub-module, configured to update, by the first terminal, the second deviation by the second increment; a first determining sub-module, configured to determine a horizontal offset of the first canvas based on the first deviation and the width of the first application interface: a second determining sub-module, configured to determine a vertical offset of the first canvas based on the second deviation and the height of the first application interface; and a controlling sub-module, configured to control the first canvas to move the horizontal offset in the horizontal direction, and to move the vertical offset in the vertical direction.

As an optional embodiment, the first determining sub-module includes: a first determining unit, configured to when the updated first deviation is greater than 0, determine the horizontal offset as a first remainder of dividing the updated first deviation by the width of the first application interface: a first acquiring unit, configured to when the updated first deviation is no more than 0, acquire a second remainder of dividing the updated first deviation by the width of the first application interface, determining the horizontal offset as the sum of the width of the first application interface and the second remainder. The second determining sub-module includes: a second determining unit, configured to when the updated second deviation is greater than 0, determine the vertical offset as a third remainder of dividing the updated second deviation by the height of the first application interface: a second acquiring unit, configured to when the updated second deviation is no more than 0, acquire a fourth remainder of dividing the updated second deviation by the height of the first application interface, and determining the vertical offset as the sum of the height of the first application interface and the fourth remainder.

As an optional embodiment, when the abscissa of a corner of the first canvas is the same as that of at least one corner of the first application interface, or the ordinate of a corner of the first canvas is the same as that of at least one corner of the first application interface, it is determined that an edge of the first canvas coincides with an edge of the first application interface in the same direction.

As an optional embodiment, the width of the first canvas is a preset multiple of the width of the first application interface, the height of the first canvas is a preset multiple of the height of the first application interface, and the preset multiple is greater than 1 but less than 3.

As an optional embodiment, the width of the first canvas is twice the width of the first application interface, and the height of the first canvas is twice the height of the first application interface.

As an optional embodiment, when the edges of the first canvas and the first application interface in the same direction do not coincide with each other, re-rendering of the content in the first canvas is prohibited.

As an optional embodiment, when the controlling operation is a scaling operation based on a target point, the controlling parameters include a scaling parameter and an offset parameter. The offset parameter is a deviation between the coordinates of the target point and the coordinates of the top-left corner of the second canvas. The updating module includes the following: a second controlling sub-module configured to control the first canvas to be scaled according to the origin point based on the updated scaling parameter to obtain the scaled first canvas with respect to the origin: a third determining sub-module configured to determine the adjusted offset parameter based on the scaling parameter and the offset parameter; a moving sub-module configured to move the scaled first canvas with respect to the origin point based on the adjusted offset parameter to obtain the scaled first canvas with respect to the target point; and a rendering sub-module configured to re-render an element in the scaled first canvas with respect to the target point to update the content of the first application interface.

As an optional embodiment, the third determining sub-module includes the following components: a third acquiring unit configured to acquire relative coordinates of the target point in the second application interface: a projecting unit configured to project the target point onto the single-size container to obtain absolute coordinates of the target point on the single-size container; a first calculating unit configured to subtract the absolute coordinates from the sum of the relative coordinates and the offset coordinates of the second application interface to obtain the first intermediate value, where the offset coordinates of the second application interface are used to indicate the difference between the coordinates of the top-left corner of the second application interface and the coordinates of the origin point on the second canvas: a second calculating unit configured to multiply the difference between the scaling parameter and 1 by the absolute coordinates to obtain a second intermediate value; and a third calculating unit configured to subtract the second intermediate value from the first intermediate value to obtain an adjusted offset parameter.

As an optional embodiment, when the controlling operation is an element adding operation, the controlling parameters include the coordinate parameter of handwriting. The update module includes a generation submodule for the first terminal to generate handwritten strokes based on the coordinate parameters of the handwritten strokes. The coordinate parameters of the handwritten strokes include coordinate parameters of writing points used to form the handwritten strokes. For each newly generated writing point at the second terminal, the coordinate parameters of all the previously generated writing points of the current handwritten stroke are transmitted to the first terminal.

As an optional embodiment, the generating submodule includes a triggering unit, configured to:

when the handwriting contacts with any edge of the first application interface, trigger the first canvas to move in a direction opposite to the direction of contacting with the edge, where when an edge of the first canvas coincides with an edge of the first application interface in the same direction, the first terminal redraws the content in the first canvas.

Embodiment 3

According to an embodiment of the present disclosure, an embodiment of a computer storage medium is provided. The computer storage medium stores a plurality of instructions, and the instructions when loaded and executed by a processor, perform any one of the above methods described in Embodiment 1. In the embodiment, the first terminal displays the same content as the second application interface of the second terminal in the first application interface, and the second terminal generates controlling parameters based on the controlling operation of the user on the second application interface. The controlling parameters is transmitted to the first terminal, and the first terminal updates the controlling parameters based on the first resolution parameter and the second resolution parameter and adjusts the content of the first application interface based on the updated controlling parameters. As a following terminal, the first terminal updates the original controlling parameter transmitted by the first terminal based on their respective resolution parameters to acquire controlling parameters that match the first application interface, thereby realizing the purpose of maintaining consistency of display contents in the application interfaces of the first and second terminals, thereby achieving following at a proportional perspective between the following terminal and the followed terminal, solving the problem of a poor effect of perspective following caused by different pixels of the followed terminal and the followed terminal.

Embodiment 4

According to yet another embodiment of the present disclosure, an intelligent interactive board is provided. The interactive board includes a processor and a memory. The memory stores a computer program. The computer program, when loaded and executed by the processor, performs any one of the above methods described in Embodiment 1.

Figure 11:
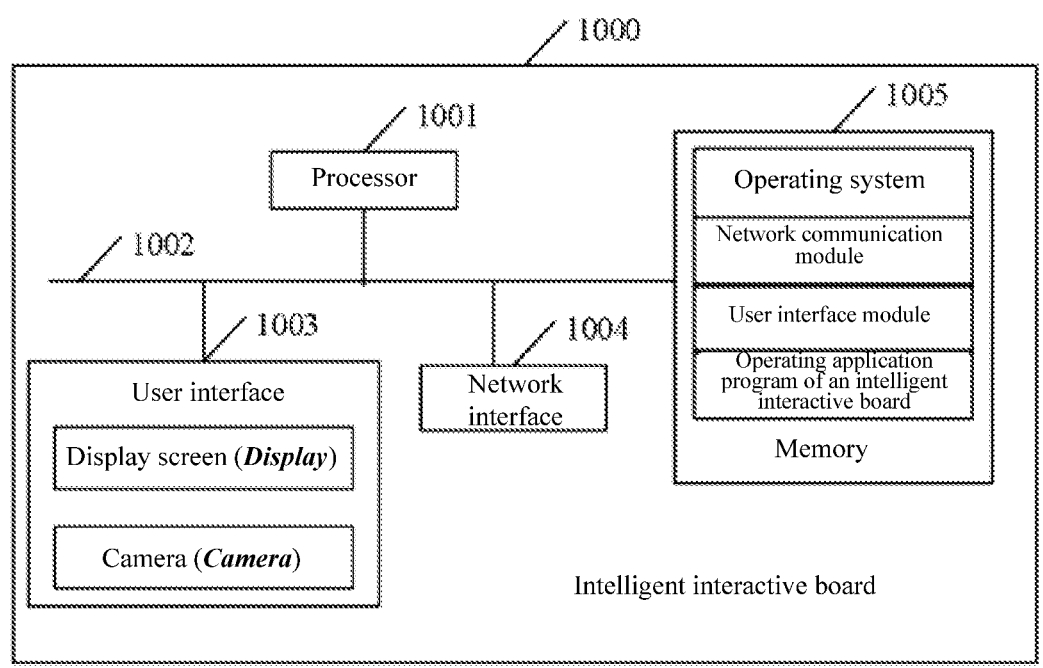
FIG. 11 is a schematic diagram of an intelligent interactive board according to an embodiment of the present disclosure.

FIG. 11 is a schematic diagram of an intelligent interactive board according to an embodiment of the present disclosure. The intelligent interactive board includes a main body of the above-mentioned interactive device and a touch frame. As shown in FIG. 11, the intelligent interactive board 1000 may include: at least one processor 1001, at least one network interface 1004, a user interface 1003, a memory 1005, and at least one communication bus 1002.

The communication bus 1002 is configured to implement connection and communication between the components.

The user interface 1003 may include a display screen (Display) and a camera (Camera), and the user interface 1003 may further include a standard wired interface and a wireless interface.

The network interface 1004 may optionally include a standard wired interface and a wireless interface (such as a WI-FI interface).

The processor 1001 may include one or more processing cores. The processor 1001 uses various interfaces and lines to connect various parts in the entire intelligent interactive board 1000. Various functions of the intelligent interactive board 1000 and process data are executed by running or executing instructions, programs, code sets or instruction sets stored in the memory 1005 and calling data stored in the memory 1005. Optionally, the processor 1001 may be implemented by using in at least one hardware form of Digital Signal Processing (DSP), Field-Programmable Gate Array (FPGA), and Programmable Logic Array (PLA). The processor 1001 may integrate one or a combination of a Central Processing Unit (CPU), a Graphics Processing Unit (GPU), a modem, and the like. The CPU mainly handles the operating system, user interface and application programs, etc.: The GPU is configured to render and draw the content that needs to be displayed on the display screen. The modem is configured to handle wireless communication. The above-mentioned modem may also be understood as being implemented separately through a chip, instead of being integrated into the processor 1001.

The memory 1005 may include a Random Access Memory (RAM), or may include a Read-Only Memory. Optionally, the memory 1005 includes a non-transitory computer-readable storage medium. The memory 1005 may be configured to store instructions, programs, codes, sets of codes or sets of instructions. The memory 1005 may include a program storage region and a data storage region, where the program storage region may store instructions for implementing an operating system, instructions for at least one function (such as a touch function, a sound playback function, an image playback function, etc.), instructions and the like for implementing the above method embodiments. The storage data region may store the data and the like involved in the above method embodiments. Optionally, the memory 1005 may also be at least one storage device located away from the aforementioned processor 1001. As shown in FIG. 8, the memory 1005 as a computer storage medium may include an operating system, a network communication module, a user interface module, and an operating application program of an intelligent interactive board.

In the intelligent interactive board 1000 shown in FIG. 8, the user interface 1003 is mainly configured to provide the user with an input interface and acquire the data input by the user. The processor 1001 may be configured to invoke the operation application of the intelligent interactive board stored in the memory 1005, and alternatively execute any one of the operations described in Embodiment 1.

The numbering of the above embodiments of the present disclosure is for description and does not represent the advantages and disadvantages of the embodiments.

In the above-mentioned embodiments of the present disclosure, the descriptions of each embodiment have their own emphases, and for parts not described in detail in a certain embodiment, reference may be made to relevant descriptions of other embodiments.

In several embodiments according to the present disclosure, it should be understood that the disclosed technical content can be implemented through alternative means. The device embodiments described above are illustrative. For example, the division of units may be a logical function division. In actual implementation, other division methods may be used. For example, multiple units or components may be combined or may be integrated into another system, or some features may be ignored or not implemented. In addition, the mutual coupling or direct coupling or communication connection shown or discussed may be through some interfaces, and the indirect coupling or communication connection of units or modules may be in electrical or other forms.

The units described as separate components may or may not be physically separated, and the components displayed as units may or may not be physical units, that is, they may be located in one place, or may be distributed to multiple units. Part or all of the units may be selected based on actual needs to achieve the purpose of the solution of the embodiment.

In addition, each functional unit in each embodiment of the present disclosure may be integrated into one processing unit. Each unit may exist as separate physical unit. Two or more units may be integrated into one unit. The above-mentioned integrated units may be implemented in the form of hardware or in the form of software functional units.

If the integrated unit is implemented in the form of a software function unit and is sold or used as an independent product, it may be stored in a computer-readable storage medium. Based on the understanding, the essence of the technical solution of the present disclosure or the part that contributes to the prior art or all or part of the technical solution may be embodied in the form of a software product. The computer software product is stored in a storage medium and includes several instructions to make a computer device (which may be a personal computer, a server, or a network device, etc.) to execute all or part of the steps of the methods described in various embodiments of the present disclosure. The above-mentioned storage media may include various media that are capable of storing program code, such as USB drives, read-only memory (ROM), random access memory (RAM), external hard drives, magnetic disks, optical discs, and others.

The above is a preferred embodiment of the present disclosure. For those skilled in the art, various modifications and improvements can be made without departing from the principles of the present invention. These modifications and improvements should also be considered within the scope of protection of the present invention.

What is claimed is:

1. A method for multi-terminal collaboratively updating a displayed content, wherein the method is used for making a first terminal synchronously display an operation of a second terminal, the first terminal provides a first application interface of a first collaborative whiteboard application, and a first canvas for carrying a drawing content of the first collaborative whiteboard application, and a first container for carrying the first canvas; the second terminal provides a second application interface of a second collaborative whiteboard application, a second canvas for carrying a drawing content of the second collaborative whiteboard application, and a second container for carrying the second canvas; a first length of the first canvas is greater than a length of the first application interface, and a width of the first canvas is greater than a width of the first application interface, the method comprising:

displaying, by the first terminal, the first application interface of the first collaborative whiteboard application, wherein the first collaborative whiteboard application and the second collaborative whiteboard application of the second terminal are in a collaborative mode, and the second terminal displays the second application interface of the second collaborative whiteboard application;

receiving a controlling parameter transmitted by the second terminal, wherein the controlling parameter is generated when the second terminal receives a controlling operation performed on the second application interface; and updating, by the first terminal, a content of the first application interface based on the controlling parameter, wherein the controlling operation is determined as a moving operation, the first canvas is moved based on the controlling parameter, and when an edge of the first canvas coincides with an edge of the first application interface in the same direction, re-rendering, by the first terminal, the content in the first canvas, and when the edges of the first canvas and the first application interface in same direction do not coincide with each other, re-rendering of the content in the first canvas is prohibited.

2. The method of claim 1, wherein the first canvas includes a first edge and a third edge that are parallel with each other, and the first application interface includes a second edge and a fourth edge that are parallel with each other, the first edge and the second edge are located on a same side, and the third edge and the fourth edge are located on a same side, the first canvas at least includes a first region close to the third edge and a second region close to the first edge, the first region is adjacent to the second region, the first region is drawn with a first content, and the second region is drawn with a second content, a moving direction of the moving operation is from a side on which the first edge is located to a side on which the third edge is located, when an edge of the first canvas coincides with an edge of the first application interface in the same direction, the re-rendering, by the first terminal, the content in the first canvas comprises:

coinciding the first edge with the second edge, moving the first canvas along a direction opposite to the direction of the moving operation to a position where the third edge coincides with the fourth edge, and triggering to re-render and display the second content in the first region, and triggering to re-render and display a third content in the second region.

3. The method of claim 1, wherein before the first terminal displays the same content as the second application interface of the second terminal on the first application interface of the first terminal, the method further comprises:

causing at least one of the first terminal and the second terminal join in a same virtual room.

4. The method of claim 1, wherein generating the controlling parameter when the second terminal receives the controlling operation performed on the second application interface comprises:

receiving, by the second terminal, the controlling operation performed on the second application interface, wherein the second canvas changes based on the controlling operation;

determining, by the second terminal, a changing parameter generated by the second canvas based on a change of the controlling operation as the controlling parameter; and transmitting, by the second terminal, the controlling parameter to the first terminal.

5. The method of claim 1, wherein when a first resolution parameter of the first application interface is different from a second resolution parameter of the second application interface, the updating, by the first terminal, the content of the first application interface based on the controlling parameter comprises:

updating, by the first terminal, the controlling parameter based on the first resolution parameter and the second resolution parameter; and updating, by the first terminal, the content of the first application interface based on the updated controlling parameter.

6. The method of claim 1, wherein the updating, by the first terminal, the controlling parameter based on the first resolution parameter and the second resolution parameter comprises:

reading, by the first terminal, the second resolution parameter transmitted by the second terminal;

acquiring, by the first terminal, a ratio of the first resolution parameter to the second resolution parameter; and multiplying, by the first terminal, the ratio by the controlling parameter to obtain an updated controlling parameter.

7. The method of claim 1, wherein the controlling parameters include: an initial coordinate parameter and a movement increment, wherein the initial coordinate includes: coordinates of a top-left corner of the first application interface and coordinates of an absolute origin on the first canvas, a first deviation in the horizontal direction and a second deviation in the vertical direction, and the movement increment includes: a first increment in the horizontal direction and a second increment in the vertical direction generated when the second canvas moves in the second application interface; moving the first canvas based on the controlling parameter comprises:

updating, by the first terminal, the first deviation by the first increment;

updating, by the first terminal, the second deviation by the second increment;

determining a horizontal offset of the first canvas based on the first deviation and the width of the first application interface;

determining a vertical offset of the first canvas based on the second deviation and the height of the first application interface; and controlling the first canvas to move the horizontal offset in the horizontal direction, and to move the vertical offset in the vertical direction.

8. The method of claim 7, wherein the determining the horizontal offset of the first canvas based on the first deviation and the width of the first application interface comprises:

when the updated first deviation is greater than 0, determining the horizontal offset as a first remainder of dividing the updated first deviation by the width of the first application interface;

when the updated first deviation is no more than 0, acquiring a second remainder of dividing the updated first deviation by the width of the first application interface, determining the horizontal offset as the sum of the width of the first application interface and the second remainder;

the determining the vertical offset of the first canvas based on the second deviation and the height of the first application interface comprises:

when the updated second deviation is greater than 0, determining the vertical offset as a third remainder of dividing the updated second deviation by the height of the first application interface;

when the updated second deviation is no more than 0, acquiring a fourth remainder of dividing the updated second deviation by the height of the first application interface, and determining the vertical offset as the sum of the height of the first application interface and the fourth remainder.

9. The method of claim 8, wherein when an abscissa of a corner of the first canvas is same as that of at least one corner of the first application interface, or an ordinate of a corner of the first canvas is same as that of at least one corner of the first application interface, determining that an edge of the first canvas coincides with an edge of the first application interface in the same direction.

10. The method of claim 1, wherein the width of the first canvas is a preset multiple of the width of the first application interface, the height of the first canvas is a preset multiple of the height of the first application interface, and the preset multiple is greater than 1 but less than 3.

11. The method of claim 10, wherein the width of the first canvas is twice the width of the first application interface, and the height of the first canvas is twice the height of the first application interface.

12. The method of claim 1, wherein when the controlling operation is a scaling operation based on a target point, the controlling parameters include: a scaling parameter and an offset parameter, and the offset parameter is a deviation between the coordinates of the target point and the coordinates of the top-left corner of the second canvas, the updating, by the first terminal, the content of the first application interface based on the controlling parameters comprises:

controlling, by the first terminal, the first canvas to scale with respect to the origin point based on the updated scaling parameter to obtain the scaled first canvas with respect to the origin;

determining an adjusted offset parameter based on the scaling parameter and the offset parameter;

controlling, by the first terminal, the scaled first canvas to move with respect to the origin point based on the adjusted offset parameter to obtain the scaled first canvas with respect to the target point; and re-rendering an element in the scaled first canvas with respect to the target point to update the content of the first application interface.

13. The method of claim 12, wherein the determining the adjusted offset parameter based on the scaling parameter and the offset parameter comprises:

acquiring relative coordinates of the target point in the second application interface;

projecting the target point onto a single-size container to obtain absolute coordinates of the target point on the single-size container;

subtracting the absolute coordinates from the sum of the relative coordinates and the offset coordinates of the second application interface to obtain a first intermediate value, wherein the offset coordinates of the second application interface are used to indicate the difference between the coordinates of the top-left corner of the second application interface and the coordinates of the origin point on the second canvas;

multiplying the difference between the scaling parameter and 1 by the absolute coordinates to obtain a second intermediate value; and subtracting the first intermediate value from the second intermediate value to obtain the adjusted offset parameter.

14. The method of claim 1, wherein when the controlling operation is an element adding operation, the controlling parameters include: a coordinate parameter of handwriting, and the updating, by the first terminal, the content of the first application interface based on the controlling parameter comprises:

generating, by the first terminal, handwriting based on the coordinate parameter of the handwriting, wherein the coordinate parameter of the handwriting includes coordinate parameters of the writing points constituting the handwriting, and transmitting, by the second terminal, the coordinate parameters of all the generated writing points of the current handwriting of the point to the first terminal each time the second terminal generates a new writing point.

15. The method of claim 14, wherein the generating, by the first terminal, the handwriting based on the coordinate parameter of the handwriting comprises:

when the handwriting contacts with any edge of the first application interface, triggering to move the first canvas in a direction opposite to the direction of contacting with edge, wherein when an edge of the first canvas coincides with an edge of the first application interface in same direction, the first terminal redraws the content in the first canvas.

16. A computer storage medium storing a plurality of instructions, wherein the instructions, when loaded and executed by a processor, perform operations of:

displaying, by a first terminal, a first application interface of the first collaborative whiteboard application, wherein a first collaborative whiteboard application and a second collaborative whiteboard application of a second terminal are in a collaborative mode, and the second terminal displays the second application interface of the second collaborative whiteboard application; wherein the first terminal provides a first application interface of the first collaborative whiteboard application, and a first canvas for carrying a drawing content of the first collaborative whiteboard application, and a first container for carrying the first canvas; the second terminal provides a second application interface of the second collaborative whiteboard application, a second canvas for carrying a drawing content of the second collaborative whiteboard application, and a second container for carrying the second canvas; a first length of the first canvas is greater than a length of the first application interface, and a width of the first canvas is greater than a width of the first application interface;

receiving a controlling parameter transmitted by the second terminal, wherein the controlling parameter is generated when the second terminal receives a controlling operation performed on the second application interface; and updating, by the first terminal, a content of the first application interface based on the controlling parameter, wherein the controlling operation is determined as a moving operation, the first canvas is moved based on the controlling parameter, and when an edge of the first canvas coincides with an edge of the first application interface in the same direction, re-rendering, by the first terminal, the content in the first canvas, and when the edges of the first canvas and the first application interface in same direction do not coincide with each other, re-rendering of the content in the first canvas is prohibited.

17. An intelligent interactive board, comprising:
a processor; and
a memory storing a computer program,
wherein the computer program, when loaded and executed by the processor, performs operations of:
displaying, by a first terminal, a first application interface of the first collaborative whiteboard application, wherein a first collaborative whiteboard application and a second collaborative whiteboard application of a second terminal are in a collaborative mode, and the second terminal displays the second application interface of the second collaborative whiteboard application; wherein the first terminal provides a first application interface of the first collaborative whiteboard application, and a first canvas for carrying a drawing content of the first collaborative whiteboard application, and a first container for carrying the first canvas; the second terminal provides a second application interface of the second collaborative whiteboard application, a second canvas for carrying a drawing content of the second collaborative whiteboard application, and a second container for carrying the second canvas; a first length of the first canvas is greater than a length of the first application interface, and a width of the first canvas is greater than a width of the first application interface;

receiving a controlling parameter transmitted by the second terminal, wherein the controlling parameter is generated when the second terminal receives a controlling operation performed on the second application interface; and updating, by the first terminal, a content of the first application interface based on the controlling parameter, wherein the controlling operation is determined as a moving operation, the first canvas is moved based on the controlling parameter, and when an edge of the first canvas coincides with an edge of the first application interface in the same direction, re-rendering, by the first terminal, the content in the first canvas, and when the edges of the first canvas and the first application interface in same direction do not coincide with each other, re-rendering of the content in the first canvas is prohibited.

* * * * *